Dec. 24, 1968   J. W. RYAN ET AL   3,417,507
PROJECTILE-FIRING TOY
Filed Feb. 10, 1966   11 Sheets-Sheet 1

INVENTORS
JOHN W. RYAN
DANIEL H. MEGGS
ROBERT EDGAR HULSE

BY Herzig, Walsh & Blacksham
ATTORNEYS

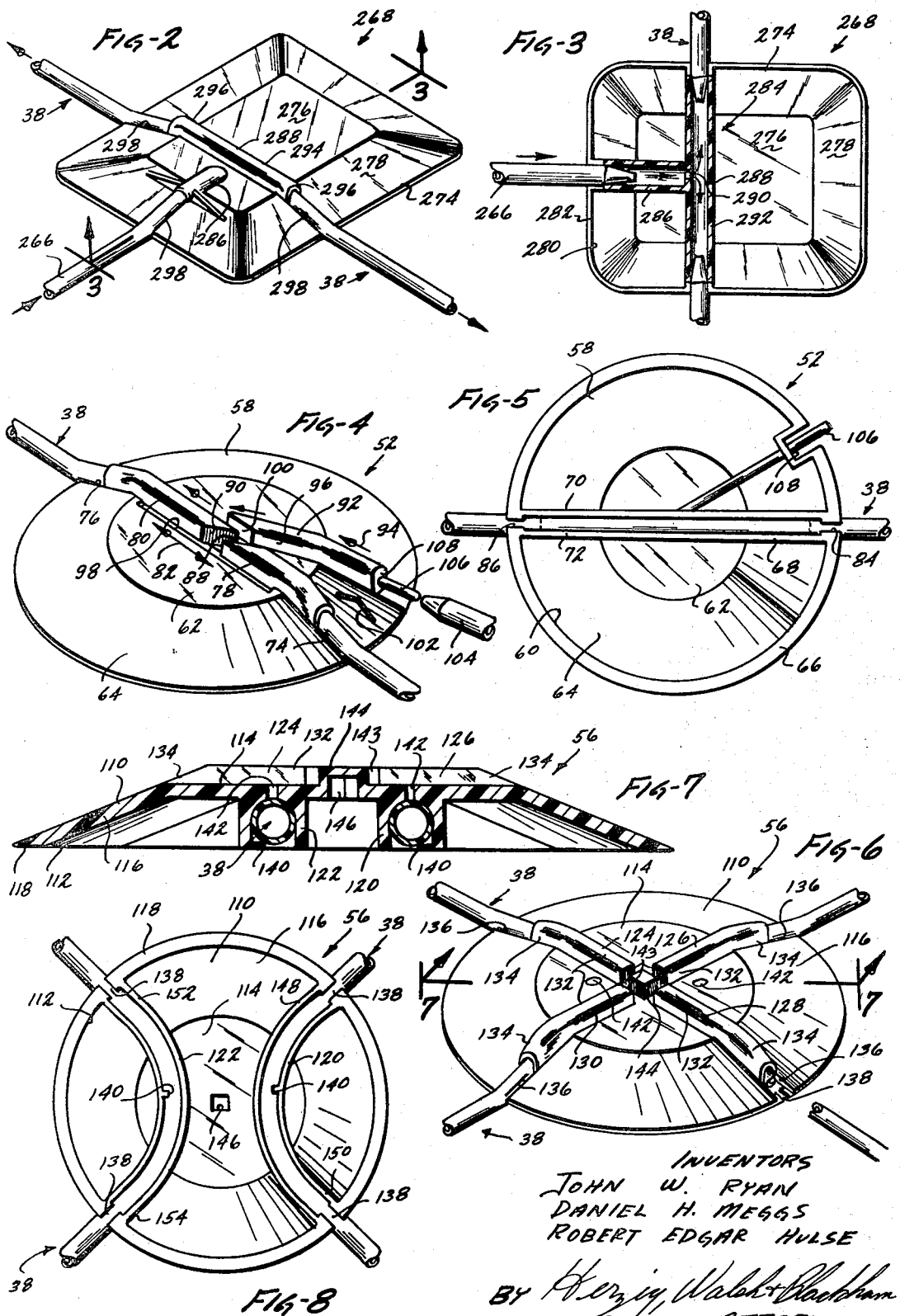

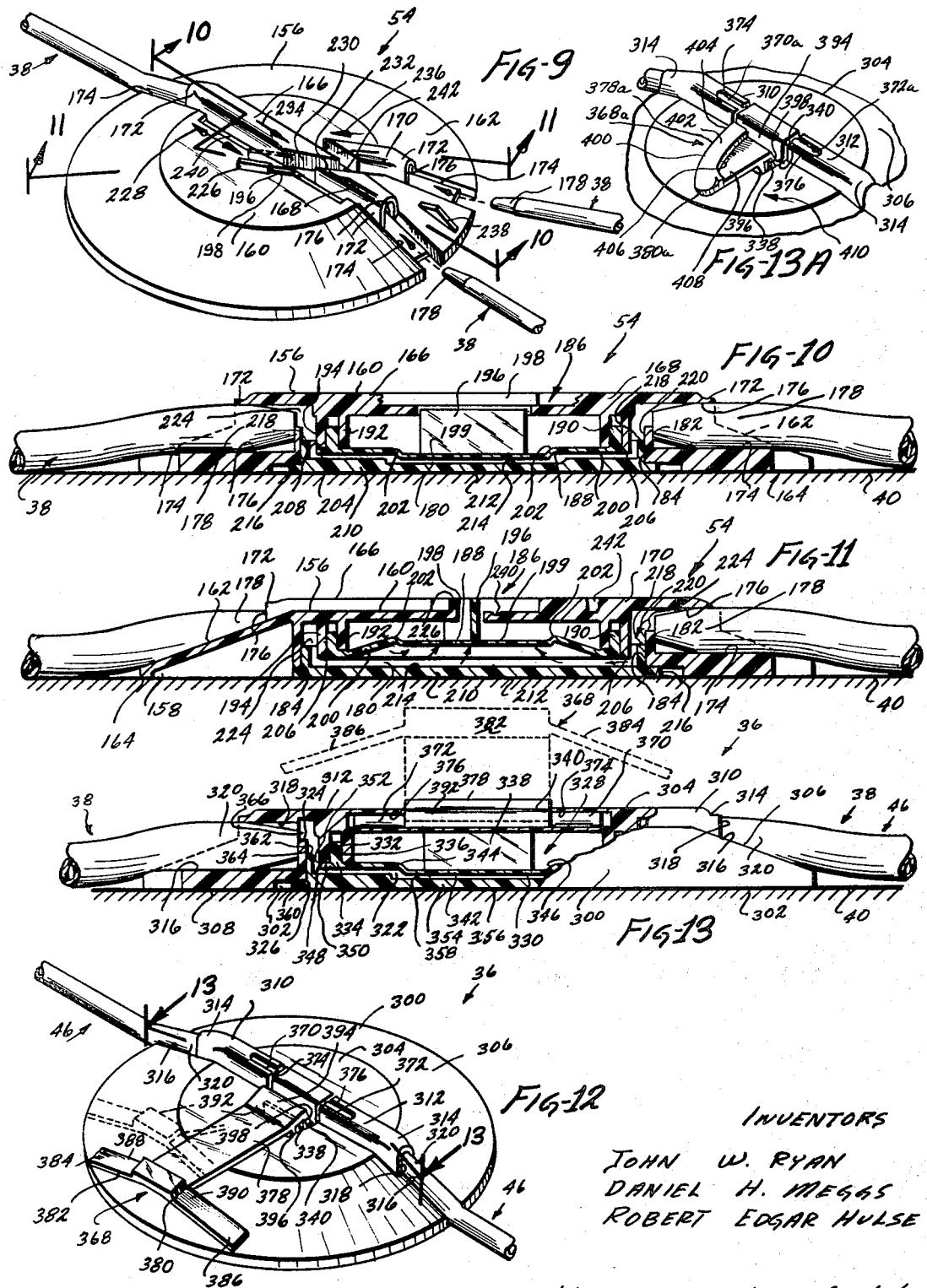

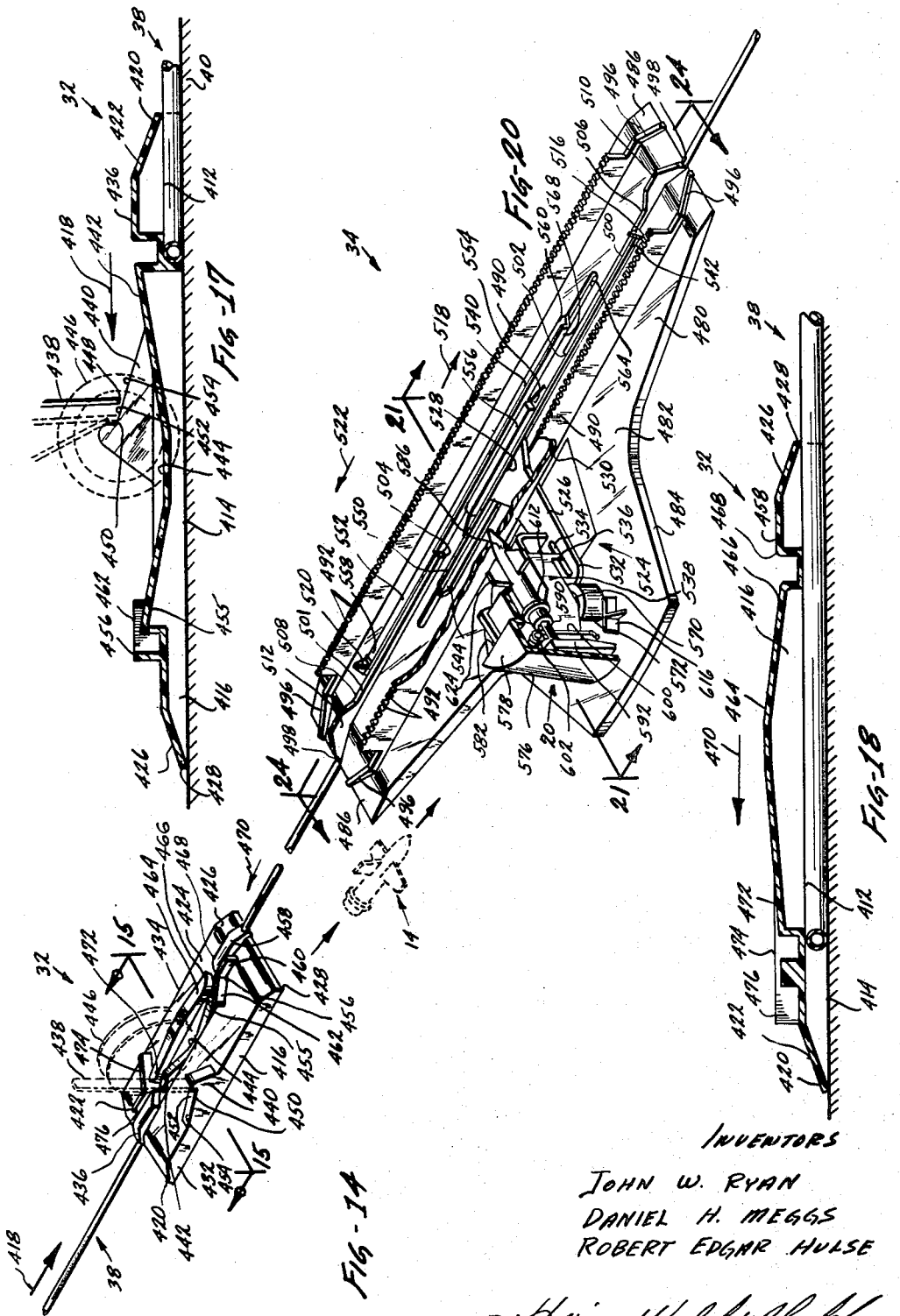

Dec. 24, 1968 J. W. RYAN ET AL 3,417,507
PROJECTILE-FIRING TOY
Filed Feb. 10, 1966 11 Sheets-Sheet 5
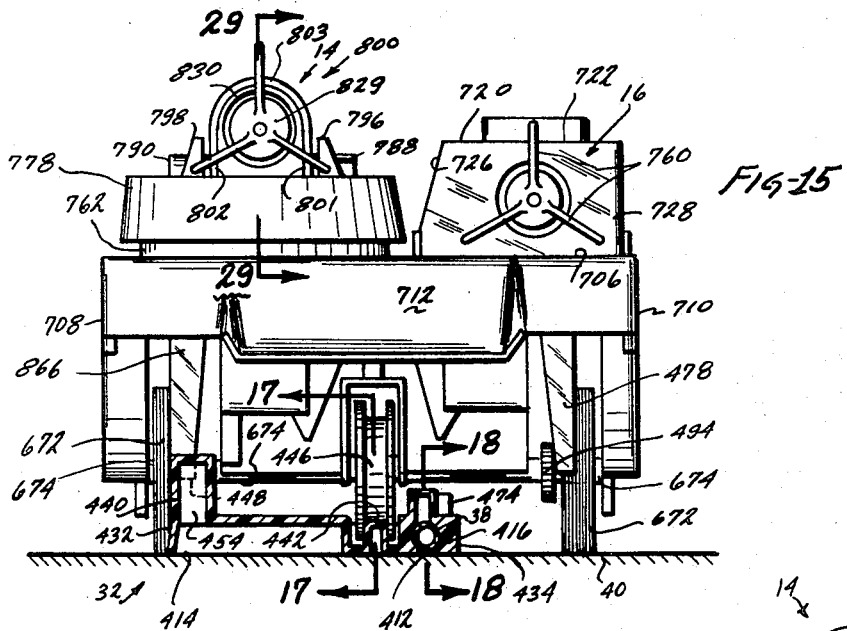
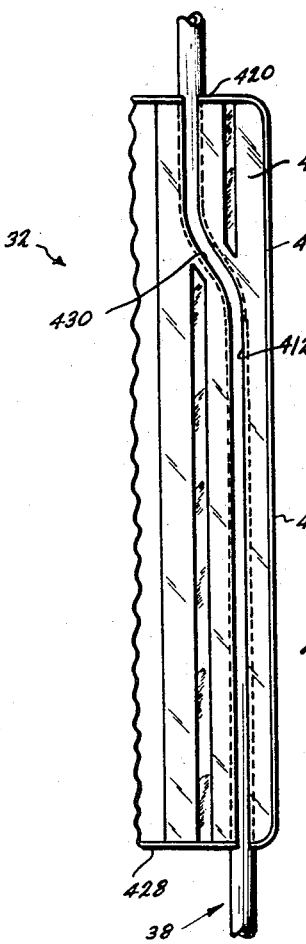
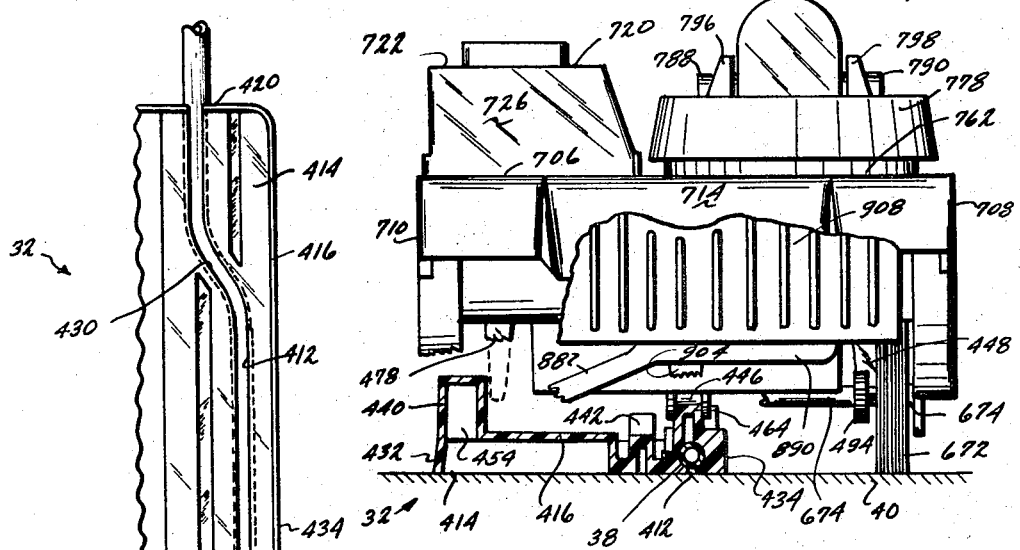
INVENTORS
JOHN W. RYAN
DANIEL H. MEGGS
ROBERT EDGAR HULSE
BY Herzig, Walsh & Blackham
ATTORNEYS

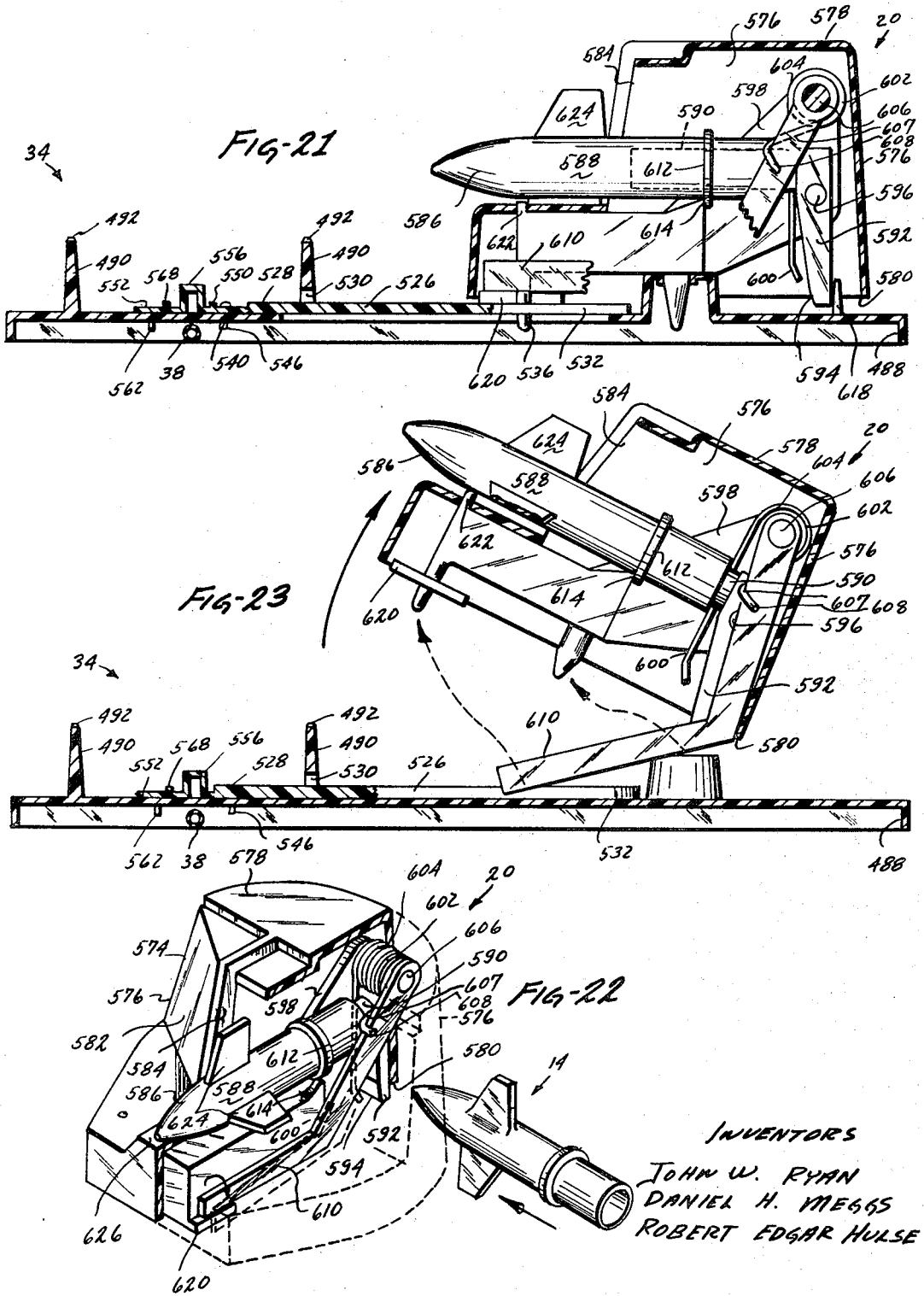

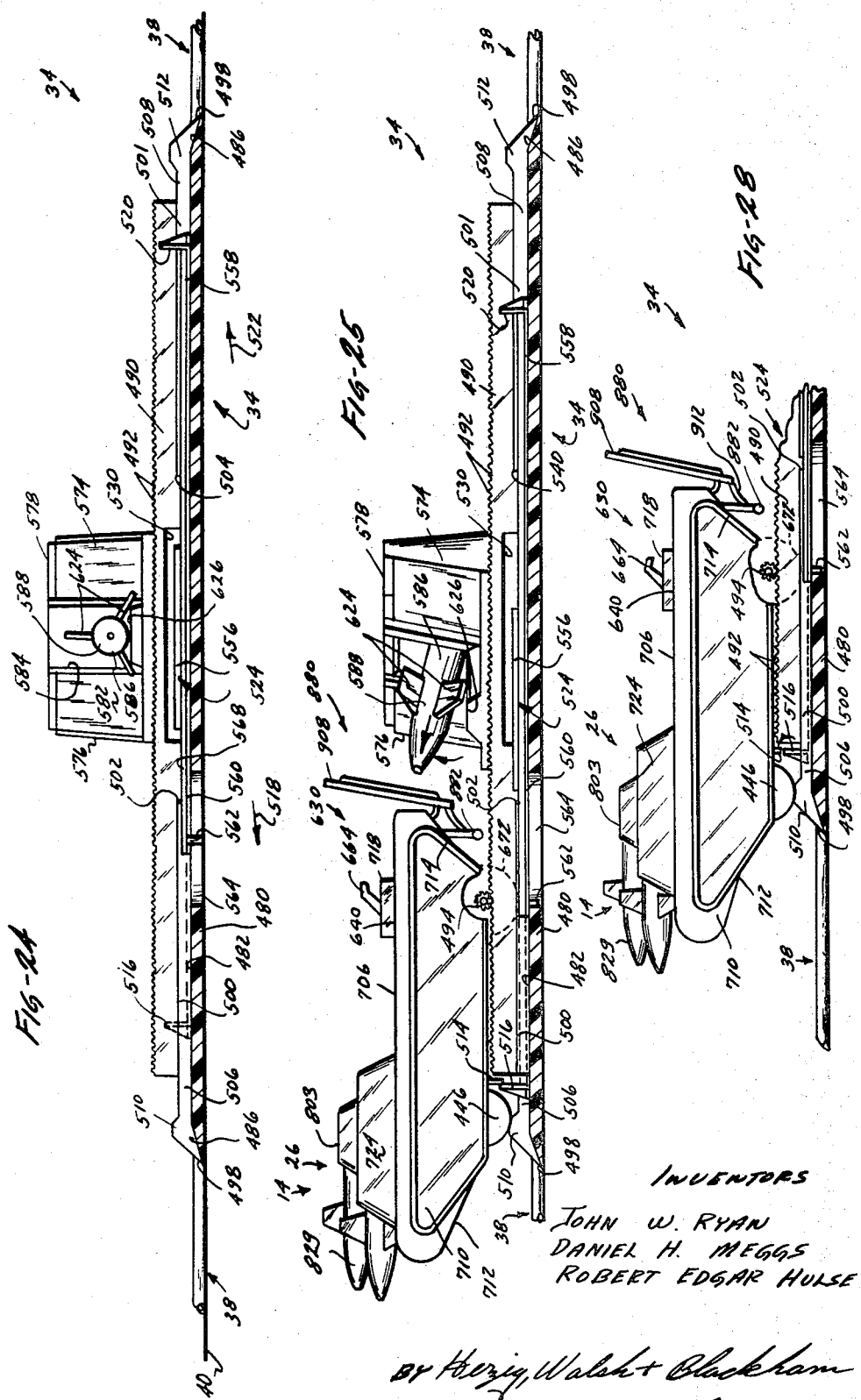

Dec. 24, 1968  J. W. RYAN ET AL  3,417,507
PROJECTILE-FIRING TOY
Filed Feb. 10, 1966  11 Sheets-Sheet 8
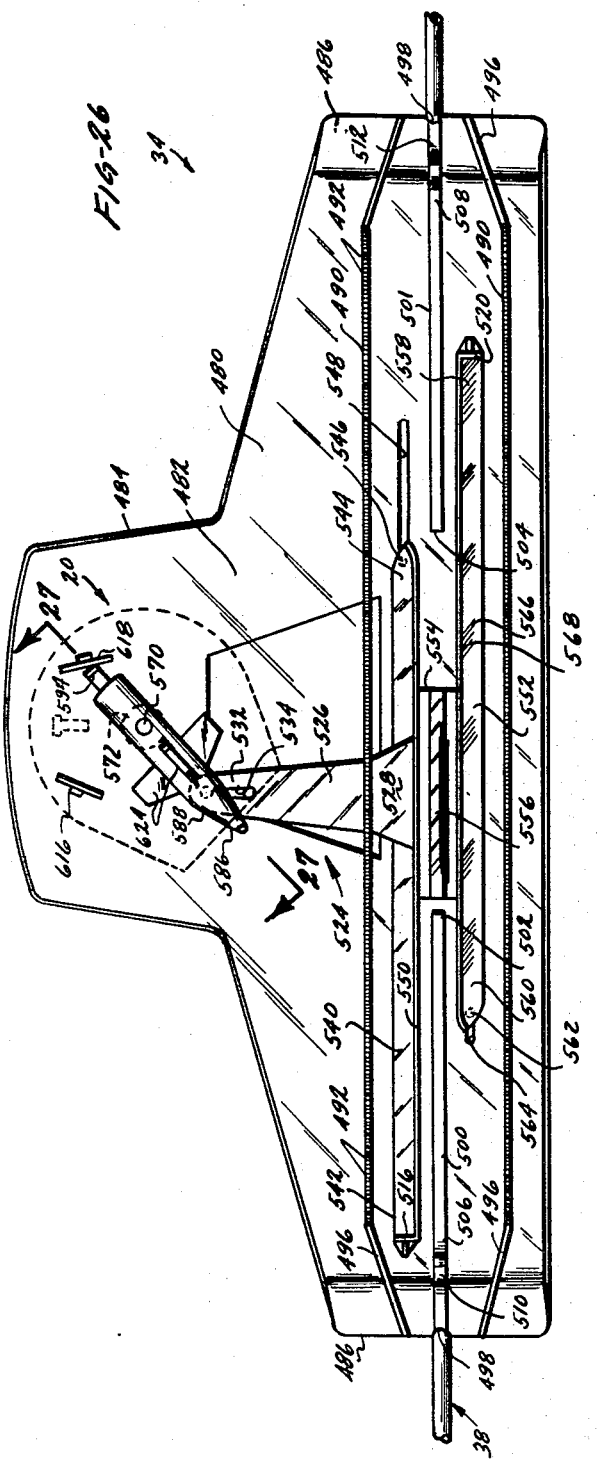
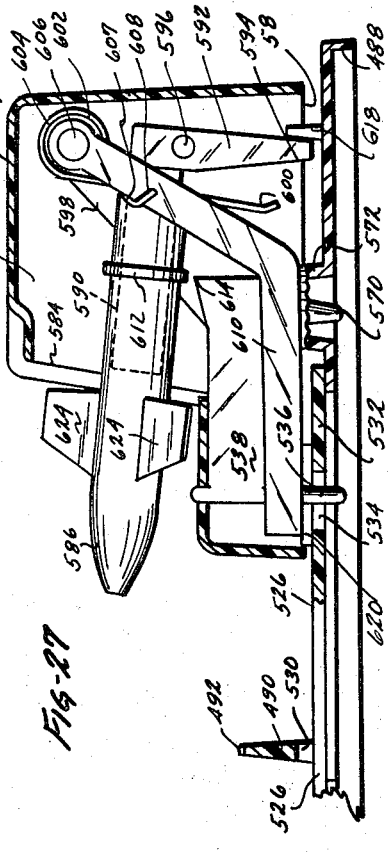
INVENTORS
JOHN W. RYAN
DANIEL H. MEGGS
ROBERT EDGAR HULSE
BY Herzig, Walsh & Blackham
ATTORNEYS

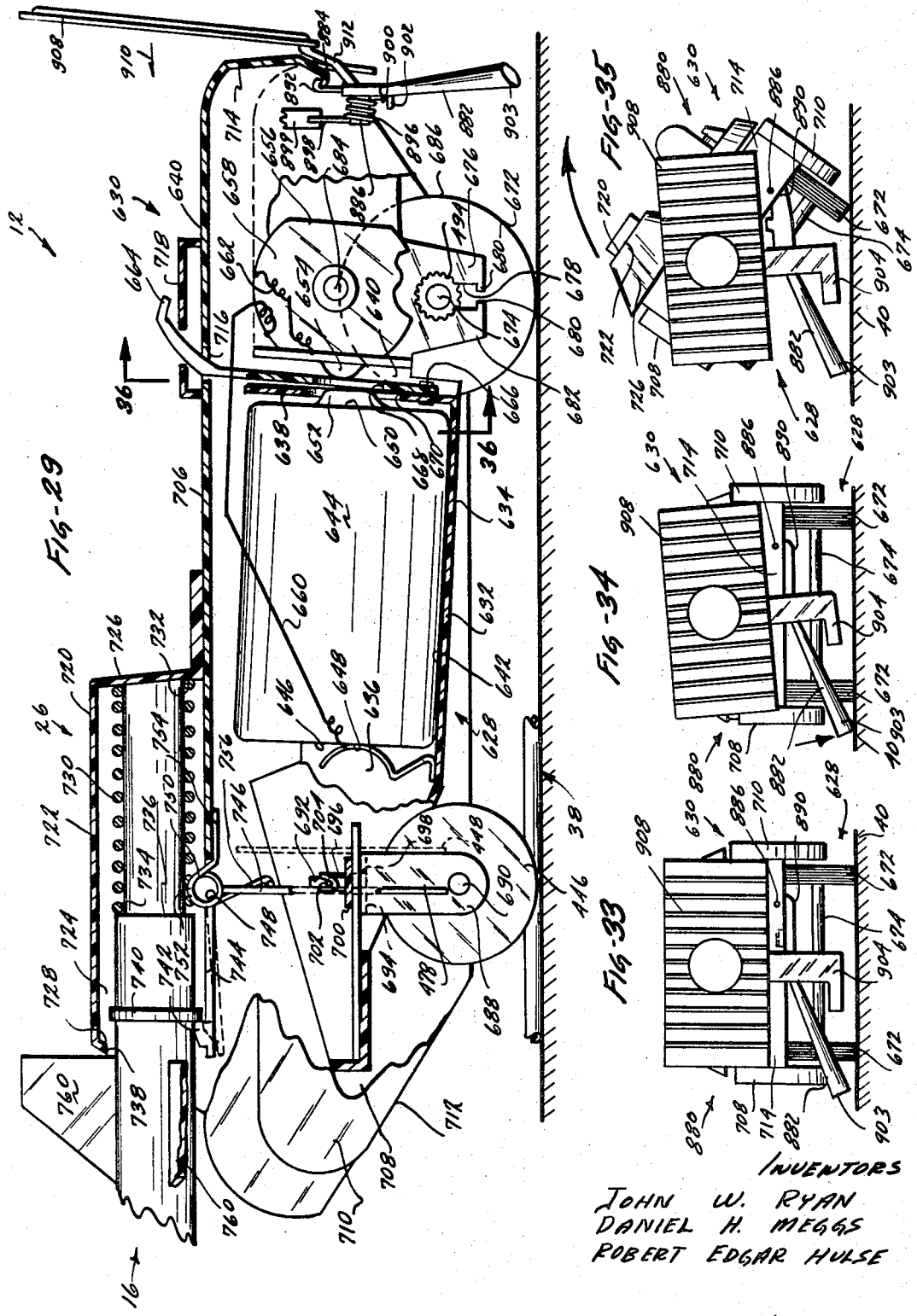

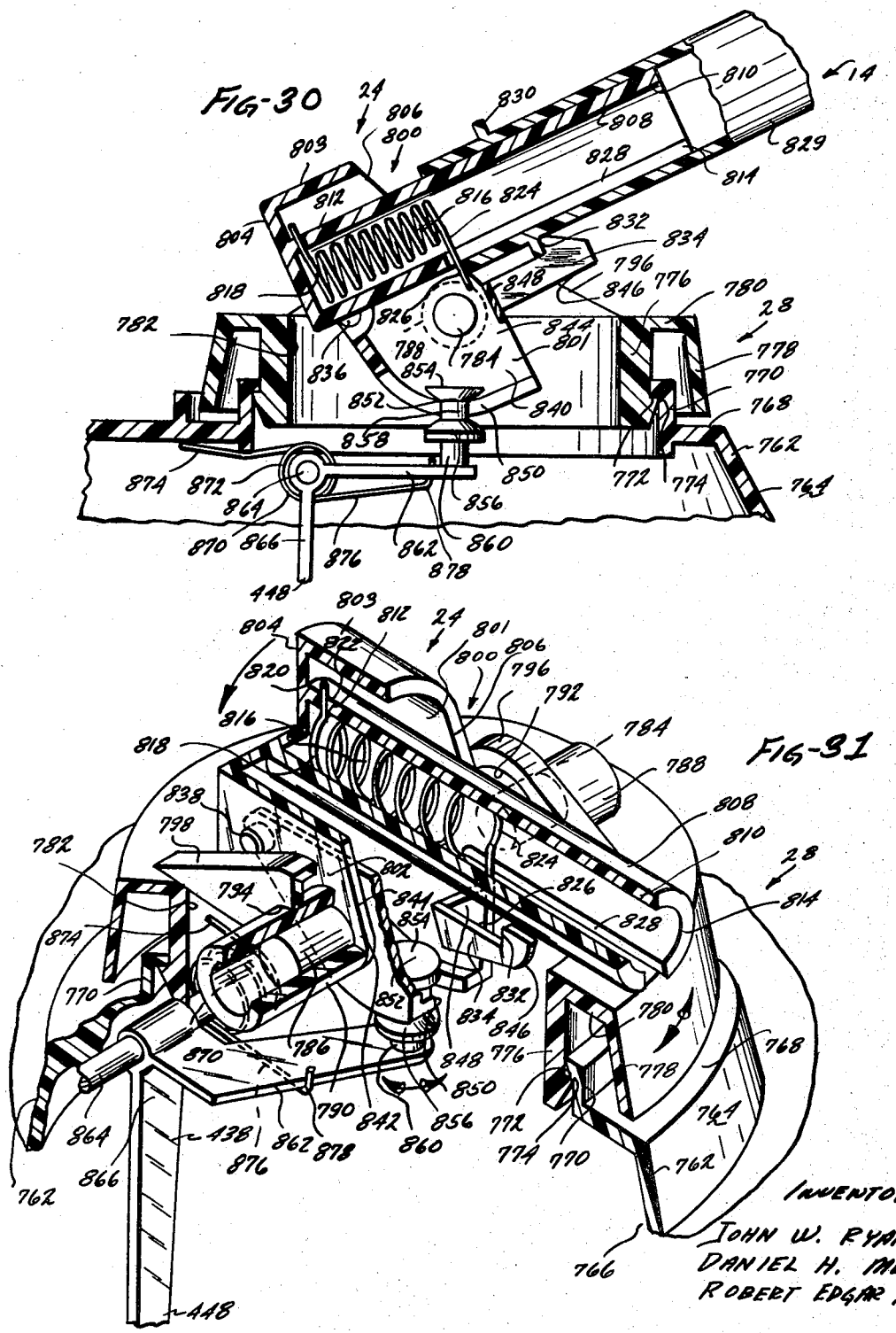

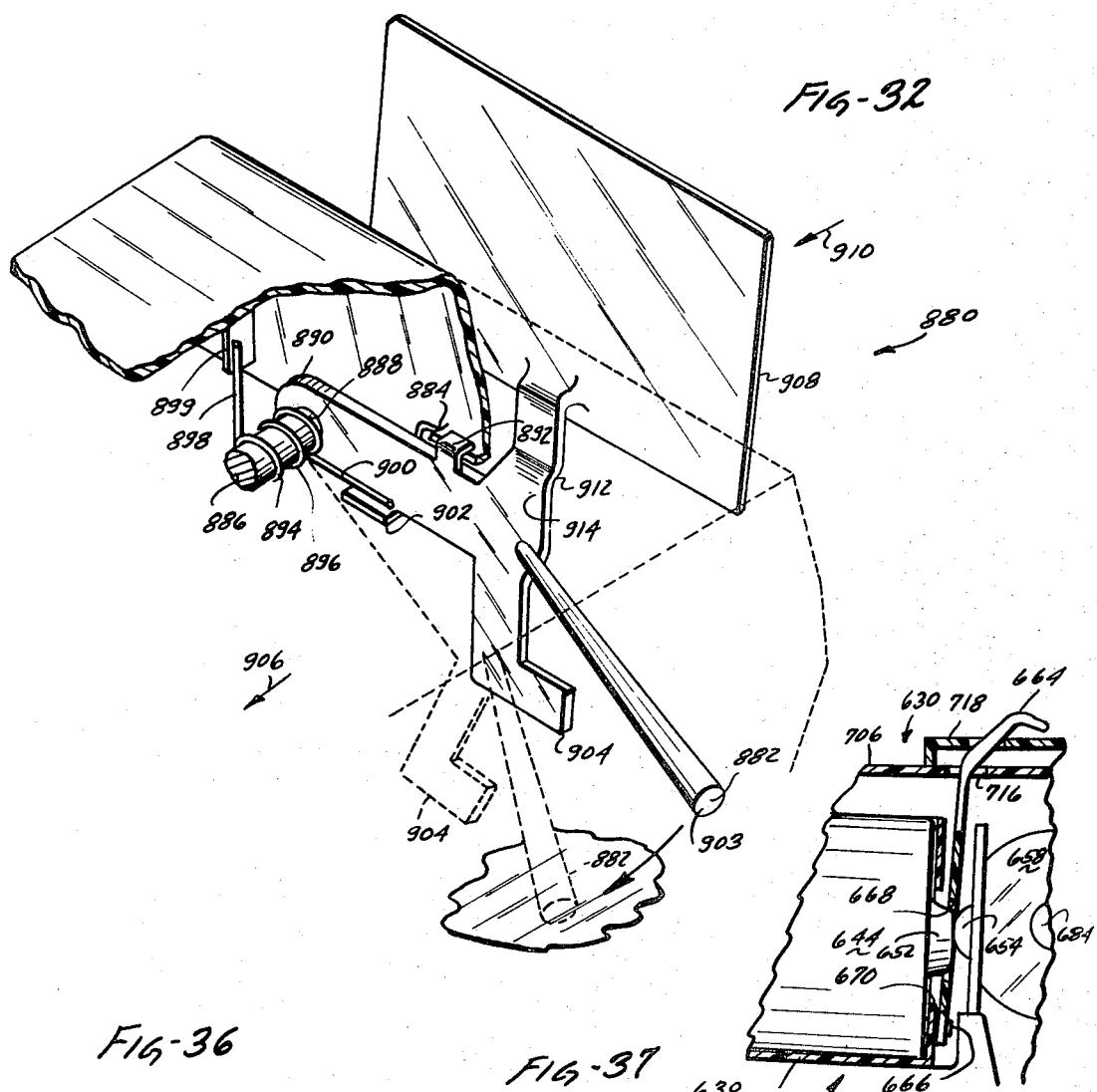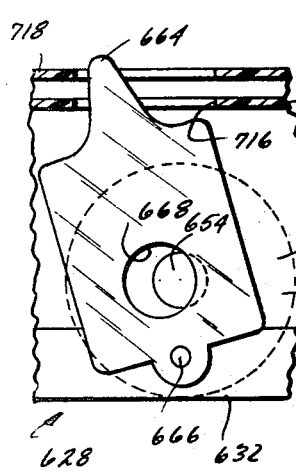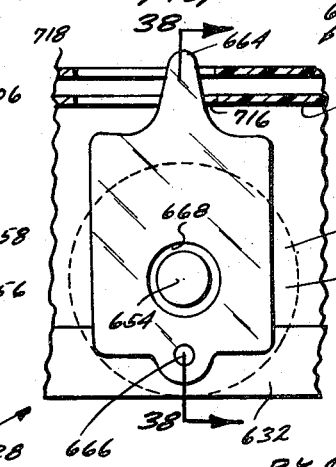

United States Patent Office 3,417,507
Patented Dec. 24, 1968

3,417,507
PROJECTILE-FIRING TOY
John W. Ryan, Bel-Air, Daniel H. Meggs, Redondo Beach, and Robert Edgar Hulse, Huntington Beach, Calif., assignors to Mattel, Inc., Hawthorne, Calif., a corporation of California
Filed Feb. 10, 1966, Ser. No. 526,411
12 Claims. (Cl. 46—202)

ABSTRACT OF THE DISCLOSURE

A toy tank is guided along a flexible track and has an aimable projectile launcher releasable by means near the track. The projectile is aimed at a fixed target which, if struck, is tipped over. If the projectile misses the target the tank passes the target and actuates means to fire a projectile from the target toward the tank, the projectile launcher of the target swings to follow movement of the tank and if a target on the latter, is struck the tank tips over. The track defines alternative path from which the tank projectile can be fired.

---

The present invention relates to a new and useful projectile-firing toy and more particularly to such a toy which includes vehicle means for transporting projectile means along a predetermined course, target means positionable in the path of travel of the vehicle means and projectile directing means for aiming projectiles at the target means.

Projectile-firing toys which include vehicle means for transporting projectile means along a predetermined course are known. One such toy is disclosed in Miller Patent No. 3,148,478 wherein a toy missile launching vehicle is used in combination with a track mechanism by which the vehicle may be caused to follow a desired path and to launch the missile when the vehicle reaches a predetermined location. This patent discloses the combination with a monorail trackway of a missile launching toy comprising a wheeled vehicle, means on the vehicle positioned for engagement with the trackway to guide the vehicle along the trackway, and an elongated missile movably mounted on the vehicle for vertical swinging movement to a generally horizontally-extending, lowered position and to an upwardly extending, raised position. Yieldable means are positioned for coaction with the missile and vehicle to yieldingly urge the missile toward the raised position. A movable means is provided on the vehicle and is positioned for movement into and out of a position in engagement with the missile to releasably hold the missile in its lowered position. In addition, means are positioned for coaction with the missile and vehicle to move the missile away from the vehicle when the missile is raised. The movable means on the vehicle engages abutment means on the trackway to move the movable means out of engagement with the missile when the vehicle reaches a predetermined position. While generally satisfactory, such toys do have certain disadvantages.

One disadvantage resides in the fact that, since the yieldable means urges the missile toward its raised position where it is automatically fired, the missile must be held in its lowered position by the movable means until it is desired to fire the missile. Thus, the missile can not be fired from positions between its raised position and its lowered position.

Another disadvantage resides in the fact that the means for holding the missile in its lowered position adds to the first cost of the toy and increases maintenance problems.

Yet another disadvantage resides in the fact that the missile cannot be aimed at targets positionable in the path of travel of the vehicle.

In view of the foregoing factors and conditions characteristic of projectile-firing toys, it is the primary object of the present invention to provide a new and useful projectile-firing toy not subject to the disadvantages enumerated above and having projectile directing means for aiming projectiles at targets positioned in the path of travel of the toy.

Another object of the present invention is to provide a new and useful projectile-carrying vehicle for transporting projectile means along a predetermined course.

Yet another object of the present invention is to provide new and useful means associated with a projectile-firing vehicle for directing the vehicle along a predetermined course.

Still another object of the present invention is to provide a new and useful target means positionable in the path of travel of a projectile-firing vehicle.

A further object of the present invention is to provide a new and useful projectile-firing means for a projectile-firing toy.

A still further object of the present invention is to provide a new and useful projectile-directing means for aiming projectiles carried by a projectile-firing vehicle at targets placed in the path of travel of the vehicle.

Another object of the present invention is to provide a new and useful pliable track system for directing a projectile-firing toy on a predetermined course.

Another object of the present invention is to provide a new and useful, remotely-controlled, fluid-actuated firing means for firing projectiles from a projectile-firing toy.

According to the present invention, a projectile-firing toy is provided which includes a projectile-carrying vehicle for transporting projectile means along a predetermined course. Means is associated with the vehicle for directing the vehicle along the predetermined course and target means are positionable in the path of travel of the vehicle. Projectile-firing means is mounted on the vehicle for firing projectiles therefrom and a projectile directing means is connected to the projectile-firing means for aiming projectiles at the target means.

The vehicle may be self propelled by any suitable means such, for example, as that shown and described in copending application Ser. No. 470,148, which was filed July 7, 1965, now Patent No. 3,337,985, and which is hereby incorporated herein by reference.

The directing means may also take any suitable form such, for example, as the pliable track system shown and described in copending application Ser. No. 465,558, which was filed June 21, 1965, now Patent No. 3,377,741, and which is also hereby incorporated herein by reference.

The target means may include pill-box means having projectile-firing means associated therewith for firing a projectile at the vehicle when the vehicle passes the pill-box means without scoring a hit thereon. The projectile fired by the pill-box means is adapted to strike a target provided on the vehicle. This target is connected to the vehicle by an upset mechanism which causes the vehicle to leave the track when it is struck by a projectile fired from the pill-box means.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which like reference characters refer to like elements in the several views.

In the drawings:
FIGURE 1 is a perspective view of a projectile-firing toy of the present invention including vehicle directing means of the present invention;
FIGURE 2 is an enlarged, perspective view of a connector means forming a part of the directing means shown in FIGURE 1;

FIGURE 3 is a cross-sectional view taken along line 3—3 of FIGURE 2;

FIGURE 4 is an enlarged, perspective view of another connector means forming a part of the directing means shown in FIGURE 1;

FIGURE 5 is a bottom view of the connector means of FIGURE 4;

FIGURE 6 is an enlarged perspective view of yet another connector means forming a part of the directing means of FIGURE 1;

FIGURE 7 is an enlarged, cross-sectional view taken along line 7—7 of FIGURE 6;

FIGURE 8 is a bottom view of the connector means shown in FIGURE 6;

FIGURE 9 is an enlarged perspective view of still another connector means forming a part of the directing means of FIGURE 1;

FIGURE 10 is an enlarged, cross-sectional view along line 10—10 of FIGURE 9;

FIGURE 11 is an enlarged, cross-sectional view taken along line 11—11 of FIGURE 9;

FIGURE 12 is an enlarged, perspective view of a first accessory means shown connected to the directing means of FIGURE 1;

FIGURE 13 is an enlarged, cross-sectional view taken along line 13—13 of FIGURE 12;

FIGURE 13a is an enlarged perspective view of a second accessory means shown connected to the directing means of FIGURE 1;

FIGURE 14 is an enlarged perspective view of a portion of the projectile-firing means forming a part of the directing means shown in FIGURE 1;

FIGURE 15 is an enlarged, cross-sectional view taken along line 15—15 of FIGURE 14;

FIGURE 16 is a cross-sectional view similar to FIGURE 15 showing the vehicle of FIGURE 1 in a different position on the projectile-firing means of FIGURE 14;

FIGURE 17 is an enlarged, cross-sectional view taken along line 17—17 of FIGURE 15;

FIGURE 18 is an enlarged, cross-sectional view taken along line 18—18 of FIGURE 15;

FIGURE 19 is a partial bottom view of the projectile-firing means of FIGURE 14;

FIGURE 20 is an enlarged perspective view of a target means which also forms a part of the vehicle directing means of FIGURE 1;

FIGURE 21 is an enlarged, cross-sectional view taken along line 21—21 of FIGURE 20;

FIGURE 22 is an enlarged, perspective view, with parts broken away to show internal construction, of a pill-box means forming a part of the target means shown in FIGURE 20;

FIGURE 23 is a view similar to FIGURE 21 showing the target means of FIGURE 20 after it has been hit by a projectile fired from the vehicle shown in FIGURE 1;

FIGURE 24 is an enlarged, cross-sectional view taken along line 24—24 of FIGURE 20;

FIGURE 25 is a view similar to FIGURE 24 showing the target means after being rotated by the vehicle of FIGURE 1;

FIGURE 26 is a plan view of the target means shown in FIGURE 20;

FIGURE 27 is an enlarged, partial cross-sectional view taken along line 27—27 of FIGURE 26;

FIGURE 28 is an elevational view showing the vehicle of FIGURE 1 in one position of operation upon the target means of FIGURE 20;

FIGURE 29 is an enlarged, partial cross-sectional view, with parts shown in elevation, of the vehicle of FIGURE 1;

FIGURE 30 is an enlarged, cross-sectional view of a projectile-firing and directing means associated with the vehicle of FIGURE 1;

FIGURE 31 is an enlarged, perspective view with parts shown in cross-section, of the projectile-firing and directing means of FIGURE 30;

FIGURE 32 is an enlarged, perspective view, with parts broken away to show internal construction, of a target means provided on the vehicle of FIGURE 1;

FIGURES 33–35 are elevational views, showing somewhat schematically, the target means of FIGURE 32 in use during a vehicle-upsetting operation;

FIGURE 36 is an enlarged, partial cross-sectional view taken along line 36—36 of FIGURE 29 showing an electrical switch means of the present invention;

FIGURE 37 is a view similar to FIGURE 36 showing the switch means thereof in a different operating position; and FIGURE 38 is an enlarged, cross-sectional view taken along line 38—38 of FIGURE 37.

*The general assembly*

Figure 1:
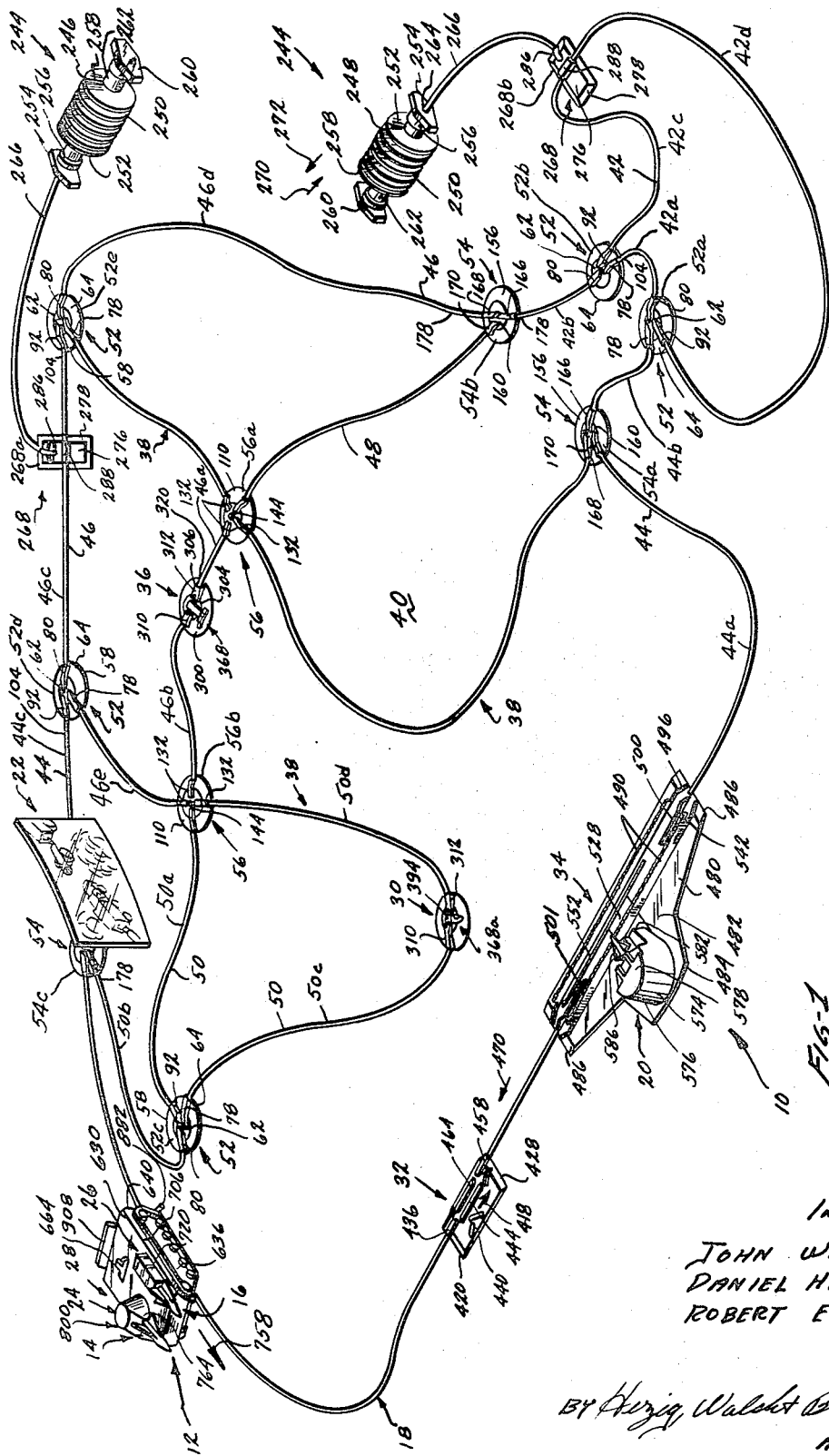

Referring again to the drawings and more particularly to FIGURE 1, a projectile-firing toy constituting a presently preferred embodiment of the invention, generally designated 10, includes a projectile-carrying vehicle 12 adapted to transport projectile means 14, 16 along a predetermined course. A suitable directing means 18 is associated with the vehicle 12 for directing it along the predetermined course so that the vehicle 12 may fire the projectile means 14 and 16 at target means 20 and 22 positionable in the path of travel of the vehicle 12.

The projectile means 14 and 16 are fired by projectile-firing means 24 and 26, respectively, associated with the vehicle 12. The projectile-firing means 24 includes projectile-directing means 28 for aiming the projectile means 14 at the target means 20 and 22.

The toy 10 also includes suitable accessory means, such as those shown at 30, 32, 34 and 36 which will be hereinafter described in detail.

*The directing means*

The directing means 18 is shown herein for purposes of illustration, but not of limitation, as comprising a pliable track system of the type disclosed in said copending applications Ser. Nos. 465,558 and 470,148. The directing means 18 includes a pliable, tubular track member 38 adapted to be placed on a suitable supporting surface 40 and contoured by hand to form the aforementioned predetermined course. A plurality of paths may be provided in the predetermined course by connecting separate sections 42, 44, 46, 48 and 50 of the pliable member 38 together by suitable connecting means, such as those shown at 52, 54 and 56. The track sections 42, 44, 46, 48 and 50 are each adapted to carry a suitable fluid under pressure and are connected together hydraulically through a system to be hereinafter described.

Referring now more in particular to FIGS. 4 and 5, each of the several connecting means 52 shown in FIGURE 1 includes a frusto-conical member 58 having an open bottom 60, a closed top wall 62 and an encompassing sidewall 64. The open bottom 60 is surrounded by a flat, annular flange 66 and is spanned by a transverse, open channel member 68 having parallel, spaced-apart rails 70 and 72 which are formed integrally with the top wall 62 and the encompassing sidewalls 64 and which depend therefrom extending to an elevation equal to that of the flange 66 so that the flange 66 and the rails 70 and 72 support the member 58 on the surface 40. The channel 68 forms a passageway for the pliable member 38 which extends through elongated slots 74 and 76 provided in the sidewall 64 in alignment with hollow track sections 78 and 80, respectively, for directing the vehicle 12 across the connecting means 52 in two directions, as indicated by the double-headed arrow 82. The elongated slots 74 and 76 each penetrate the flange 66 forming restricted portions 84 and 86, respectively, through which the pliable track member 38 may be snapped into position within the passageway formed by the channel 68 and retained in position therein.

The track section 78 includes a beveled end 88 which is positioned adjacent a beveled end 90 provided on the track section 80. These beveled ends direct the vehicle 12 from a track section 92, provided on the top wall 62 adjacent the track sections 78 and 80, to the track section 80 when the vehicle 12 is traveling in the direction of arrow 94. The vehicle 12 is guided toward the beveled end 90 by a sidewall portion 96 which is provided on track section 92 in alignment with the beveled end 90 of the track section 80. When the vehicle 12 is traveling from the track section 80 to the track section 78, the likelihood of the vehicle being misdirected from the section 80 to the section 92 is minimized by providing a recessed groove 98 in the top wall 62 adjacent each side of the base of the track sections 78 and 80 and by forming an end 100 on the section 92 in such a manner that the end 100 lies parallel to the track sections 78 and 80.

The vehicle 12 includes rear wheel means, to be hereinafter described in detail, which are prevented from becoming wedged between the converging ends 88 and 100 of the track sections 78 and 92, respectively, when the vehicle 12 is traveling in the direction of arrow 94 by a protuberance 102 provided on the sidewall 64 intermediate the track sections 78 and 92.

One end 104 of each of the sections 42, 44, 46 and 50 (FIG. 1) may be plugged by an associated stopper means 106 (FIGS. 4 and 5) provided on the end 108 of each track section 92 in such a location that each end 104 guides the vehicle 12 onto an associated track 92 without creating a fault in the hydraulic system.

Referring now more in particular to FIGS. 6–8, each connector means 56 includes a frusto-conical member 110 having an open bottom 112, a closed top wall 114 and an encompassing sidewall 116. The open bottom 112 is encompassed by a flat, annular flange 118 which supports the member 110 on the surface 40 in cooperation with a pair of arcuate channel members 120 and 122 forming passageways for the pliable member 38.

Each connector means 56 also includes a plurality of track sections 124, 126, 128 and 130 each of which includes a portion 132 extending across the top wall 114 and a hollow, sloping U-shaped portion 134 extending along the sidewall 116 in alignment with an elongated slot 136 provided in the sidewall 116. Each slot 136 includes a restricted portion 138 extending through the annular flange 118 for retaining the pliable member 38 in position in an associated passageway formed by the arcuate channels 120 and 122. A laterally extending tab member 140, which may be formed during a molding operation by coring extends downwardly from the top wall 114 through apertures 142, in each channel member 120, 122 intermediate the restricted portions 138 for also retaining the pliable member 38 in position. The track sections 124, 126, 128 and 130 each includes a flat end 143 spaced from a common, square, upstanding, hollow protuberance 144 provided on the top wall 114 for forming a common continuation for each of the track sections 124, 126, 128 and 130. The upstanding, protuberance 144 may be formed on the top wall 114 by displacing the material thereof upwardly leaving a square aperture 146 on the underside of the top wall 114.

The sloping portion 134 of the track 128 overlies a first end 148 of the channel 120 and the sloping portion 134 of the track 126 overlies a second end 150 of the channel 120. With this arrangement, a single length of pliable member 38 may be employed for directing the vehicle 12 on tracks lying at right angles to each other without interrupting the pliable member 38 or subjecting it to sharp bends which would impede the flow of fluid therethrough. Similarly, the end 134 of the track 130 overlies a first end 152 on the channel 122 and the end 134 of the track 124 overlies a second end 154 of the channel 122 so that a single length of pliable member 38 may connect track sections lying at right angles without impeding the flow of fluid through the pliable member 38.

The connecting means 54 will be described in detail in connection with FIGS. 9–11 showing a frusto-conical member 156 having an open bottom 158, a closed top wall 160 and an encompassing sidewall 162. The open bottom 158 is encompassed by a flat, annular flange 164 which supports the member 156 on the surface 40.

A plurality of elongated track sections 166, 168, and 170 are provided on the top wall 160 for directing the vehicle 12 from one section of the pliable member 38 to another section thereof in a manner to be hereinafter described. Each of the sections 166, 168 and 170 includes a sloping end 172 extending along the encompassing sidewall 162 in alignment with an associated open channel 174 provided in the sidewall 162 for each of the track sections 166, 168 and 170. Each of the ends 172 is provided with a counterbore 176 adapted to receive the ends 178 of the pliable track sections 42, 44, 46, 48 and 50 (FIGURE 1) for placing the sections in fluid communication with pressure chamber 180 provided in each connector means 54. Each pressure chamber 180 is formed by a cylindrical skirt 182 depending from an associated top wall 160 and including an open bottom 184. Fluid pressure within the chamber 180 is adapted to act upon a remotely-controlled, fluid-actuated switching means 186. The switching means 186 includes a circular diaphragm 188 which is mounted in the chamber 180 by an annular rib 190 and the protuberance 204 may be formed interfrictional engagement between a pair of depending, concentric, cylindrical skirt members 192 and 194 both of which depend from the top wall 160 inside the skirt 182. A vehicle-directing flange 196 extends upwardly from the diaphragm 188 to a position within a slot 198 provided in the top wall 160. The flange 196 is normally in a depressed position, as shown in FIG. 10, and may be extended upwardly through the slot 198 by pressurizing the chamber 180 to flex the diaphragm 188 upwardly, as shown in FIG. 11. This flexing is facilitated by providing the diaphragm 188 with a dished central portion 199 which is joined to a concentric outer portion 200 by a transition section 202. A slight protuberance 204 is provided on the outer peripheral edge 206 of the diaphragm 188 for engagement in a small notch 208 provided in the skirt 194 at such a location that the flange 196 will be disposed within the slot 198 when the protuberance 204 is engaged within the notch 206 during assembly operations. The switching means 186 may be installed by inserting it through the open bottom 184 of the skirt 182 after which a closure member 210 may be used to close the open bottom 184. The closure member 210 is a circular, cap-like member forming a bottom wall 212 having a dished portion 214 which accommodates the dished portion 199 of the diaphragm 188. The closure member 210 includes a peripheral lip 216 and an inset, annular shoulder 218 for sealing the member 210 to the skirt 182 when the member 210 is snapped into place in the open bottom 184 by engaging the shoulder 218 against the inner wall 220 of the skirt 182. A suitable fluid under pressure, such as air, is supplied to the chamber 180 by the pliable member 38 through suitable apertures 224 provided in the skirt 182 in alignment with the counterbores 176. The amount of pressure required to flex the diaphragm 188 may be minimized by making the diaphragm 188 of a soft, pliable material, such as rubber or soft plastic. For manufacture convenience, the flange 196, the rib 190 and the protuberance 204 may be formed integrally from the same material during the molding operation. This, however, results in the flange 196 also being soft and flexible so that it could become deflected to an inoperative position by the vehicle 12 when the flange 196 is in its FIG. 11 vehicle-deflecting position. Excessive flexing is prevented, though, by providing a backup plate 226 on the top wall 160 adjacent the flange 196. The plate 226 is spaced sufficiently from the track section 166 so that the plate 226 will not deflect the vehicle 12 when the flange 196 is in its FIG. 10, lowered position.

The track section 166 is aligned with the track section 168 for directing the vehicle 12 over the connector means 54 in the two directions indicated by the double-headed arrow 228. However, an end 230 of the section 166 and an end 232 of the section 168 are cut on such an angle and are spaced sufficiently apart that the vehicle 12 may be directed onto the track section 170 when the flange 196 is raised to its FIG. 11 position while the vehicle 12 is traveling on track section 166 in the direction of arrow 234, in a manner to be hereinafter described. The track section 170 is arranged on the top wall 160 in such a manner that the vehicle 12 will be directed from the track section 170 to the track section 166 when the vehicle 12 travels over the connector means 54 in the direction of arrow 236. When traveling in this direction, the wheels of the vehicle 12, to be hereinafter described, are prevented from being wedged between the track sections 168 and 170 by an upstanding deflector plate 238 which is provided on the sidewall 162 intermediate the track sections 168 and 170.

The likelihood of unwanted turning of the vehicle 12 from the track section 166 onto the track section 170 when the vehicle 12 is traveling along the track section 166 in the direction of arrow 234 is minimized by providing grooves 240 and 242 at the base of the track sections 166 and 168 for coaction with a portion of the vehicle 12 to be hereinafter described.

Referring again more in particular to FIG. 1, a suitable fluid, such as air, for operating the switch means 186 and the accessory means 30 and 36 may be supplied and controlled by a suitable fluid supply and control means, generally designated 244, which is shown herein for purposes of illustration, but not of limitation, as comprising two separate bellows-type units 246 and 248. The units 246 and 248 each includes an accordion-pleated body portion 250 having a first end 252 to which a handle member 254 is connected by a conduit 256 and a second end 258 to which a handle 260 is connected by a stem 262. Each handle member 254 is provided with an outlet aperture, as shown at 264 for the unit 248, for establishing fluid communication with the pliable track member 38 through a conduit 266 and a T-connector 268. It is apparent that when the handle of members 254 and 260 are pushed toward each other, as indicated by the arrows 270, the pliable track member 38 and the connector means 54 will be pressurized and that when the handle members 254 and 260 are pulled away from each other, as indicated by the arrows 272, the pliable track member 38 and the connector means 54 will be evacuated.

Each T-connector 268 (FIGS. 2 and 3) includes a body portion 274 having a flat top wall 276, a sloping sidewall 278 and an open bottom 280. A peripheral shoulder 282 encompasses the open bottom 280 for supporting the T-connection 268 on the surface 40. A T-shaped fluid-flow passageway 284 may be formed integrally with the body portion 274 from a suitable plastic during a molding operation. The passageway 284 includes a first leg 286 to which an associated conduit 266 is connected and a second leg 288 which is connected to the leg 286 at right angles thereto. The legs 286 and 288 are placed in fluid communication with each other through an orifice 290 provided in the sidewall 292 of the leg 288. The leg 288 includes a raised portion 294 which extends across the top wall 276 forming a track section thereon. The portion 294 has a U-shaped cross section and includes rounded ends 296 forming a transition section with the pliable member 38 onto the portion 294. The pliable member 38 and the conduit 266 are recessed within associated elongated slots 298 provided in the sidewall 278.

*The accessory means*

The accessory means 36 is shown in FIGS. 1, 12 and 13 as comprising a remotely controlled, fluid-actuated accessory means and includes a frusto-conical body portion or member 300 having an open bottom 302, a closed top wall 304 and an encompassing sidewall 306. The open bottom 302 is encompassed by a flat, annular flange 308 which supports the member 300 on the surface 40.

Two elongated, aligned track sections 310 and 312 are provided on the top wall 304 for directing the vehicle 12 thereover. Each of the sections 310, 312 includes a sloping end 314 extending along the encompassing sidewall 306 in alignment with an associated open channel 316 provided in the sidewall 306 for each track section 310, 312. Each of the ends 314 is provided with a counterbore 318 adapted to receive the ends 320 of track section 46 formed therein by severing it intermediate its ends 104 and 178. This places the track section 46 in fluid communication with a fluid pressure chamber 322 provided in the accessory means 36. The pressure chamber 322 is formed by a cylindrical skirt 324 depending from the top wall 304 and includes an open bottom 326. Fluid pressure within the chamber 322 is adapted to act upon a remotely controlled, fluid-actuated means 328 which includes a circular diaphragm 330 mounted in the chamber 322 by an annular rib 332 extending upwardly from the diaphragm 330 into frictional engagement between a pair of depending, concentric, cylindrical skirt members 334 and 336 depending from the top wall 304 inside the skirt 324. A flange 338 extends upwardly from the diaphragm 330 to a position within a rectangular aperture 340 provided in the top wall 304. The flange 338 is normally in a depressed position as shown in FIG. 12, and may be extended upwardly through the aperture 340 by pressurizing the chamber 322 to flex the diaphragm 330 upwardly. This flexing is facilitated by providing the diaphragm 330 with a dished, central portion 342 which is joined to a concentric, outer portion 344 by a transition section 346. A slight protuberance 348 is provided on the outer peripheral edge 350 of the diaphragm 330 for engagement in a small notch 352 provided in the skirt 334 at such a location that the flange 338 will be disposed within the aperture 340 when the protuberance 348 is engaged within the notch 352 during assembly operations. The fluid-actuated means 328 may be placed within the chamber 322 by inserting the means 328 through the open bottom 326 of the skirt 324. A closure member 354 may then be used to close the open bottom 326. The closure member 354 comprises a circular, cap-like member forming a bottom wall 356 having a dished portion 358 which accommodates the dished portion 342 of the diaphragm 330. The closure member 254 includes a peripheral lip 360 and an inset, annular shoulder 362 for sealing the closure member 354 to the skirt 324 when the member 354 is placed in the open bottom 326 by engaging the shoulder 362 against the inner wall 364 of the skirt 324.

A suitable fluid under pressure, such as air, is supplied to the chamber 322 by the units 246 and 248 through the pliable track member 38 and suitable apertures provided in the skirt 324, such as the one shown at 366 in FIG. 13. The amount of pressure required to flex the diaphragm 330 may be minimized by making the diaphragm 330 of a soft, pliable material, such as rubber or a soft plastic. For manufacturing convenience, the flange 338, the rib 332 and the diaphragm 330 may be formed integrally from the same material during a suitable molding operation. When the diaphragm 330 is flexed upwardly by air pressure in the chamber 322, the flange 338 engages a vehicle-contacting accessory means 368 swinging it from the solid line position shown in FIG. 12 to the broken line position shown therein. The means 368 swings upwardly about a pair of pivot pins 370, 372 journaled in slots 374 and 376 provided in the track sections 310 and 312, respectively.

The vehicle-contacting accessory means 368 engages the vehicle 12 for a purpose and in a manner to be hereinafter described in detail and includes an arm 378 having a free end 380 extending over the sidewall 306. The free end 380 carries a vehicle engaging member 382 having ends 384 and 386 forming shoulders with associated ramp members 388 and 390, respectively. The ramp members 388 and 390 facilitate the passing of the vehicle 12 over the accessory means 36 in a manner to be hereinafter described and also aid in the release of the portion of the vehicle which contacts the member 382. The end 392 of arm 378 which is remote from the free end 380 carries an S-shaped member 394 having a first U-shaped portion 396 which straddles the flange 338 providing a suitable surface which the flange 338 engages in swinging the member 368 to its FIG. 12 broken line position. The S-shaped member 392 includes another U-shaped portion 398 forming a slot for the free passage of a flanged portion of the vehicle 12 to be hereinafter described in detail. The portion 398 extends downwardly into the rectangular aperture 340 so that a slot will be present in both the depressed and elevated positions of the member 368.

The accessory means 30 (FIG. 13a) is identical to the accessory means 36 except that the vehicle-contacting accessory means 368 is replaced with a vehicle-contacting accessory means 368a which is swingably mounted in the slots 374 and 376 by pins 370a and 372a respectively. The vehicle-contacting accessory means 368a includes an arm 378a having a free end 380a which is somewhat pointed and which forms a part of a crescent-shaped land 400 having an upper surface 402 sloping upwardly and inwardly from an edge portion 404 of the arm 378a to a raised edge 406 forming a somewhat L-shaped shoulder with a flat, intermediate portion 408 of the arm 378a for engagement by a portion of the vehicle 12 to be hereinafter described in detail. This engagement occurs upon the elevation of arm 378a to an operative position only when the vehicle 12 is traveling over the track sections 310 and 312 in the direction of an arrow 410. When the vehicle 12 is traveling over the track sections 310 and 312 in the opposite direction, the smoothness of the sloping surface 402 permits the engageable portion on the vehicle 12 to pass thereover without interference from the arm 378a. The L-shaped nature of the edge 406 assures that the member on the vehicle 12 which is adapted to engage the edge 406 will be brought into engagement therewith even though the accessory means 30 is located in a sharp curve formed in the pliable member 38. The arm 378a normally rests upon the top wall 304 in an inoperative position and may be swung upwardly to an operative position by pushing the handles 254 and 260 toward each other in the direction of arrows 270 (FIG. 1) on either of the units 246 and 248 to flex a diaphragm identical to the diaphragm 330 shown in FIG. 13 in connection with the accessory means 36. This flexing causes a flange identical to the flange 338 shown in FIG. 13 to engage an S-shaped portion 394 identical to that described in connection with FIG. 12.

Referring now more in particular to FIGS. 1 and 15–28, the accessory means 32 is adapted to actuate the projectile firing means 24 releasing the projectile 14. The projectile directing means 28 may be positioned beforehand in such a manner that the projectile 14 will strike the target means 20.

The accessory means 32 may be positioned at any suitable location relative to the target means 20 without severing the pliable track member 38 by engaging the member 38 in a channel 412 (FIG. 19) provided on the underside 414 of a base member 416 comprising the body portion of the accessory means 32. When the vehicle 12 travels in the direction of arrow 418 (FIGS. 1 and 14) on the pliable member 38, it approaches an upstream end 420 of the base member 416, travels up a ramp 422 provided on the upstream end 420, crosses the upper surface 424 of the base member 416 and passes down a ramp 426 provided at the downstream end 428 of the member 416. The channel 412 includes a dog-leg portion 430 which positions the channel 412 approximately midway between the edges 432 and 434 of the base member 416 at its upstream end 420 and adjacent the edge 434 at its downstream end 428.

A first track section 436 (FIG. 14) is provided on the upper surface 424 of the base member 416 adjacent the end 420 in alignment with the pliable member 38 for directing the vehicle 12 onto the base member 416 in such a position that a lever or trigger 438 forming a part of the projectile firing means 24 will be aligned with an abutment 440 provided on the upper surface 424. A second track section 442 is also provided on the upper surface 424 and includes a central portion 444 which is depressed below the surface 424 adjacent the abutment 440. The track section 442 is aligned with the track section 436 so that the trigger 438 will remain in alignment with the abutment 440 as a flanged wheel 446, forming a part of a steering means on the vehicle 12 to be hereinafter described in detail, sinks into the depressed portion 444. This brings the end 448 of the trigger 438 into engagement with a shoulder 450 provided on the abutment means 440 adjacent the upper end 452 of a ramp 454 forming an approach to the shoulder 450 when the vehicle 12 travels in the direction of arrow 418. The flanged wheel 446 then continues traveling along track section 442 arriving at its downstream end 455 where it is deflected by an angularly disposed deflector plate 456 onto a third track section 458.

The section 458 is provided on the surface 424 in alignment with the pliable member 38 at the downstream end 428 of the base member 416. Proper engagement of the flanged wheel 446 with the third track section 458 is assured by an upstanding flange 460 which is provided on the upper surface 424 in spaced, parallel relationship with the third track section 458 and which includes an upstream end 462 mounted in abutting relationship with the plate 456.

The third track section 458 is aligned with a fourth track section 464 having an upstream end 466 positioned adjacent the downstream end 468 of the track section 458 for receiving the flanged wheel 446 when the vehicle 12 travels along the pliable member 38 in the direction of arrow 470 (FIG. 14). The flanged wheel 446 will then travel along the fourth track section 464 to its downstream end 472 where the wheel 446 will be deflected by a second angularly disposed deflector plate 474 onto the first track section 436. The wheel 446 then engages a guide flange 476 which is provided on the upper surface 424 in abutting relation with the plate 474 for guiding the wheel 446 into correct alignment with the track section 436. The fourth track section 464 is elevated sufficiently above the surface 424 to permit a lever 478 (FIG. 16) forming a part of the projectile firing means 26 to clear the abutment 440 when the flanged wheel 446 travels over the track section 464 in the direction of arrow 470.

Referring now more in particular to FIGS. 1 and 20–28, the accessory means 34 includes a substantially T-shaped base member 480 having a top wall 482, sidewalls 484, sloping end walls 486 and an open bottom 488. A pair of rails 490 are mounted on the top wall 492 provided on the upper surface thereof for imparting increased traction to the vehicle 12 through suitable Alpine gear means, such as the one shown at 494 in FIGS. 25 and 28. The vehicle 12 is directed from the flexible member 38 onto the rails 490 by a suitable guide member 496 extending from each end of each rail 492 down an associated ramp 486 toward the member 38 extending through U-shaped apertures 498 provided in the end walls 486.

A pair of aligned rails 500 and 501 are mounted on the top wall 482 with their first ends 502 and 504, respectively, spaced from each other a predetermined amount. The rails 500 and 501 include second ends 506 and 508, respectively, extending down an associated end wall 486 into engagement with the pliable member 38 for guiding the vehicle 12 from the pliable member 38 to the accessory means 34. The ends 506, 508 are provided with built-up portions 510 and 512, respectively, for elevating the vehicle 12 as shown in FIGS. 25 and 28 permitting a depending lug 514 to clear an abutment 516 when the vehicle 12 travels in the direction of arrow 518 to be released from an abutment 520 when the vehicle travels in the direction of arrow 522.

The abutments 516 and 520 form an integral part of a target-swinging mechanism 524 which is reciprocably mounted on the top wall 482 and which is connected to the target means 20 by an arm 526 having a first end 528 extending through an elongated slot 530 provided in one of the track sections 490 and a second end 532 pivotally connected to the target means 20. This pivotal connection is accomplished by providing an elongated slot 534 in the end 532 and by engaging a fixed pin 536, which is connected to the target means 20 by a plate 538, in the slot 534. The end 528 of the arm 526 is affixed to a first push rod 540 having a first end 542 which carries the abutment means 516 and a second end 544 which carries a rivet 546 received within a slot 548 provided in the top wall 482. The push rod 540 is given a certain amount of rigidity and resistance to buckling by a reinforcing web 550 extending from the end 542 to the end 544 and is connected to a second push rod 552 by a plate 554 which carries a short rail section 556. The second push rod 552 includes a first end 558 which carries the abutment 520 and a second end 560 which carries a rivet 562 received in an elongated slot 564 provided in the top wall 482. The second push rod 552 also includes a base portion 566 and is given rigidity and resistance to buckling by a reinforcing web 568.

The target means 20 is pivotally mounted on the top wall 482 by a pin 570 which depends from the plate 538 into engagement with a hollow boss 572 provided on the top wall 482. The target means 20 includes a housing 574 simulating a gun turret. The housing 574 includes an encompassing sidewall 576, a top wall 578 and an open bottom 580. The sidewall 576 includes a flat front portion 582 having a rectangular opening 584 provided therein through which a projectile 586 may be fired.

The projectile 586 includes a hollow, tubular body portion 588 which may be slidably received on a first arm 590 of an L-shaped, projectile-receiving member 592 having a second arm 594 extending from the arm 590 substantially normal thereto. The member 592 is pivotally mounted in the housing 574 by a shaft 596 which is rotatably mounted in an upwardly extending portion 598 of the plate 538. The projectile 586 receives a firing force from an arm 600 of a torsion spring 602. The spring 602 includes a body portion 604 coiled about a shaft 606 rotatably mounted in the upwardly extending portion 598 of the plate 538 and another arm 607 having a hooked portion 608 engaging a tripping lever 610 affixed to the shaft 606. The projectile 586 is retained in position on the arm 590 against the force exerted by the spring 602 by engaging an annular collar 612 behind a shoulder 614 provided on the plate 538. The collar 612 may be released from the shoulder 614 when it is desired to fire the projectile 586 by rotating the housing 574 in such a manner that the arm 594 of the member 592 engages either a first upstanding plate 616 or a second upstanding plate 618 mounted on the top wall 482 in such positions that engagement by the arm 594 swings the member 592 elevating the arm 590. The housing 574 may be rotated to the position shown in FIG. 26 where the arm 594 engages the plate 618 by sliding the mechanism 524 in the direction of arrow 518. This may be accomplished by causing the vehicle 12 to travel across the accessory means 34 in the direction of arrow 518 so that the lug 514 will engage the abutment means 516 pulling the member 524 along on top wall 482 until the projectile 586 is fired at the vehicle 12 causing it to upset in a manner to be hereinafter described in detail. However, the projectile 14 carried by the vehicle 12 may, in a manner to be hereinafter described, be fired at the target means 20 causing it to upset before the vehicle 12 reaches the accessory means 34. Then as the vehicle 12 travels across the accessory means 34 with the lug 514 engaging the abutment means 516, it becomes necessary to elevate the lug 514 out of engagement with the abutment means 516 after the mechanism 524 reaches the end of its travel. This is accomplished when the wheel 446 rides up on top of the built-up portion 510 of the rail 500, as shown in FIG. 28. It is apparent that the housing 574 will be rotated until the arm 594 engages the plate 616 when the mechanism 524 is moved in the direction of arrow 522 by lug 514 when vehicle 12 travels across the accessory means 34 in the direction of arrow 522.

The target means 20 is caused to upset when struck by the projectile 14 by the tripping lever 610 which is biased by the spring 602 for rotation in a counterclockwise direction, as viewed in FIGS. 21–22 and 27. The lever 610 may be prevented from rotating by engaging it on top of a lug 620 affixed to the member 538. When the target means 20 is struck by the projectile 14, the lever 610 slides off of the lug 620 and bears upon the top wall 482 causing the target means 20 to rotate in a clockwise direction, as viewed in FIG. 23, to an upset position adjacent the accessory means 34. The lever 610 may be prevented from becoming disengaged from the lug 620 during pivotal movements of the housing 574 by pivotally connecting the plate 538 to the housing 574 by the pin 536 and an aligned pin 622 so that lateral displacement of the lever 610 with respect to the lug 620 during rotation of the housing 574 on pin 570 is minimized. The projectile 586 includes a plurality of fins 624 and may be guided into position on arm 590 by engaging two of the fins 624 on a flat land 626 (FIG. 24) formed in the sidewalls 576.

*The projectile-carrying vehicle*

Referring now more in particular to FIGS. 1, 25 and 28–38, the vehicle 12 comprises a chassis 628 and a body 630. The chassis 628 includes a frame 632 having a bottom wall 634 and upstanding, parallel, spaced-apart sidewalls 636. A partition 638 (FIG. 29) is mounted between the walls 636 adjacent the rear end 640 of the vehicle 12 forming a battery chamber 642 in the frame 632.

A standard dry cell battery 644 may be housed in the chamber 642 and includes a first end 646 engageable with an electric, cantilever-type leaf spring 648 and a second end 650 on which is provided an electrical contact 652 engageable with an electrical contact 654 affixed to the housing 656 of an electric motor 658. The leaf spring 648 is affixed to the bottom wall 634 and is connected to the motor 658 by an electrical conductor 660. An electrical conductor 662 connects the motor 658 to the contact 654.

The motor 658 may be energized by bringing the contacts 652 and 654 into engagement with each other by swinging a switch 664 about its pivot pin 666 from the position shown in FIG. 36 to the position shown in FIG. 37 where an aperture 668 provided in the switch 664 is aligned with an aperture 670 provided in the partition 638.

The chassis 628 also includes a pair of rear wheels 672 which are rotatably mounted on a rear axle 674 rotatably mounted on a pair of brackets, one of which is shown at 676 in FIG. 29. Each bracket 676 depends from the frame 632 and is provided with an elongated slot 678 which receives the rear axle 674. The axle 674 is removably retained in the slots 678 by a pair of spaced projections 680 carried by the free end 682 of the brackets 676. The brackets 676 may be made from a material having sufficient resiliency to permit springing the projections 680 apart so that the axle 674 and wheels 672 may be removed for cleaning. The wheels 672 are rotated by frictional engagement with an output shaft 684 extending from each end of the motor 658. Since the axle 674 is free to reciprocate within the slot 678, the weight of the vehicle 12 will assure proper engagement of the output shaft 684 with the wheels 672. One of the Alpine gears 494 is affixed to each wheel 672 for rotation thereby. Since each wheel 672 is rotated by frictional engagement with its outer periphery 686, the gears 494 increase the gear ratio of the vehicle 12 when the gears 494 engage the racks 490 on accessory means 34 with the wheels 672 elevated out of contact with the top wall 482. This supplies increased power for pushing the mechanism 524 to rotate the target means 20.

The chassis 628 also includes the wheel 446 which is rotatably mounted in a bifurcated bracket 688 by a shaft 690. The bracket 688 is pivotally connected to the frame 632 by an upstanding shaft 692 having one end affixed to the bight portion 694 of bracket 688 and a free end 696 extending up through a sleeve 698 which is connected to the frame 632 by a washer 700. The end 696 of shaft 692 carries an outwardly extending pin 702 which works in a V-shaped slot 704 to assure that the wheel 446 is always aligned with the pliable member 38. The chasis 632 also includes the lug 514 which depends from the frame 632 in alignment with the abutment means 516 when the vehicle 12 travels in the direction of arrow 518 and in alignment with the abutment means 520 when the vehicle 12 travels in the direction of arrow 522 on accessory means 34.

The body 630 includes a top wall 706, a left-hand sidewall 708, a right-hand sidewall 710, a front wall 712 and a rear wall 714. The top wall 706 is provided with an elongated slot 716 through which the switch 664 extends to a position above a simulated hatch cover 718.

The projectile firing means 26 (FIG. 29) is mounted on the upper wall 706 and includes a housing 720 having a top wall 722, sidewalls 724, a rear wall 726 and a front wall 728. A compression spring 730 is mounted in the housing 720 and has one end 732 bearing against the rear wall 726 and another end 734 engageable by the end 736 of the projectile 16 for compressing the spring 730 when the projectile 16 is slid into position through an aperture 738 provided in the front wall 728. The projectile 16 is retained in position within the housing 720 by an annular collar 740 which engages a lug 742 carried by an arm 744 of a trigger 746. The trigger 746 includes the lever 478 (FIG. 16) which extends downwardly within the vehicle 12 substantially normal to the arm 744. The trigger 746 is pivotally connected to the body 630 by a pin 748 and the lug 742 is biased into engagement with the collar 740 by a torsion spring 750 having a body portion 752 coiled about the pin 748, a first arm 754 engaged under the top wall 706 and a second arm 756 engaged behind the depending lever 478.

The projectile 16 may be fired at a suitable target, such as the target 22 (FIG. 1), by directing the vehicle 12 along the end 320 of track section 46 and over accessory means 36 in the direction of arrow 758 while pressurizing chamber 322 (FIG. 13) with one of the units 244 to elevate the vehicle-contacting means 368 so that it engages the depending lever 478 causing the trigger 746 to pivot in a counterclockwise direction, as viewed in FIG. 29, lowering the lug 742 from engagement with the collar 740, as indicated in broken lines in FIG. 29. The energy stored in compressed spring 730 then propels the projectile 16 toward the target 22 while a plurality of fins 760 provided on the projectile 16 stabilize its flight.

A simulated turret base or member 762 is provided on the top wall 706 and includes an encompassing sidewall 764, an open bottom 766, an annular top wall 768 and a collar 770. The collar 770 has an inwardly-extending, annular flange 772 engageable by an outwardly extending, annular flange 774 provided on the projectile directing means 28. The directing means 28 is rotatably mounted on the member 762 and includes spaced-apart sidewalls 776 and 778 straddling the collar 770 and a top wall 780 disposed above the collar 770. The top wall 780 is provided with a rectangular opening 782 in which the projectile firing means 24 is pivotally mounted on trunnions 784 and 786 rotatably mounted in sleeves 788 and 790 respectively. The sleeves 788 and 790 are secured in apertures 792 and 794 provided in associated trunnions supports 796 and 798, respectively, which are mounted on the top wall 780 adjacent opposite sides of the rectangular opening 782.

The projectile firing means 24 includes a first yoke assembly 800 having parallel, spaced-apart legs 801 and 802 connected together by a bight portion 803. The yoke 800 includes a rear wall 804 and an open front 806 and is mounted for vertical, pivoting movements within the opening 782 on the trunnions 784 and 786 extending from the legs 801 and 802, respectively, at right angles thereto. A cylindrical, projectile-receiving member 808 includes an encompassing sidewall 810 and has a first end 812 affixed to the rear wall 804 and a free, open end 814 extending out over the projectile-directing means 28. A projectile-firing, compression spring 816 is mounted in the projectile-receiving member 808 and includes a first end 818 having an extension 820 secured in an aperture 822 provided in the encompassing sidewall 810 and a second end 824 having an extension 826 slidably received in an elongated slot 828 provided in the sidewall 810.

The extension 826 extends sufficiently below the member 808 to be engaged by the encompassing sidewall 829 of the projectile 14 when it is slid into position over the member 808 for compressing the spring 816 to store energy therein. The projectile 14 is retained in position against the force exerted by the compressed spring 816 by an annular collar or flange 830 which encompasses the sidewall 828 and which is engageable behind a shoulder 832 provided on a latch 834. The latch 834 is adapted to be actuated to release the projectile 14 regardless of the elevation or azimuth of the member 808. This is accomplished, in part, by pivotally mounting the latch 834 between the legs 801 and 802 of the first yoke 800 on trunnions 836 and 838 which engage the legs 801 and 802, respectively. The trunnions 836 and 838 are carried by a pair of legs 840 and 842 provided on a second yoke 844. The latch 834 also includes a finger 846 which carries the shoulder 832 and which is affixed to the legs 840 and 842 by a bracket 848. The second yoke 844 includes a pair of parallel, spaced-apart, inturned, arcuate flanges 850 forming an arcuate channel in which a spool 852 is received.

The spool 852 includes a first frusto-conical end piece 854 adapted to ride on the upper surface of the flanges 850, and a second frusto-conical end piece 856 adapted to ride on the lower surface thereof. The end pieces 854 and 856 are connected together by a first cylindrical member 858 disposed between the flanges 850. A second cylindrical member 860 connects the end piece 856 to an arm 862 forming a part of the trigger 438 which is pivotally mounted in the simulated turret base 762 on a shaft 864. The trigger 438 also includes an arm 866 depending from the arm 862 at right angles thereto and extending downwardly within the body 630 to a position superjacent the surface 40 where the previously mentioned end 448 (FIGS. 29 and 17) is engageable with suitable accessory means, such as the abutment 440, for firing the projectile 14 by being swung in a clockwise direction, as viewed in FIG. 30, to lower the spool 852 which, in turn, pivots the latch 834 in a clockwise direction about the trunnions 836 and 838 releasing the shoulder 832 from engagement with the annular flange 830. The energy stored in compressed spring 816 then propels the projectile 14 from the member 808. The shoulder 832 is normally maintained in engagement with the flange 830 by a spring 870 having a body portion 872 coiled about the shaft 864, a first arm 874 engaged under the top wall 706 and a second arm 876 connected to the arm 862 by a hooked end 878.

The projectile 14 may be aimed at a suitable target by rotating the projectile directing means 28 to swing the member 808 in horizontal plane and by pivoting the member 808 in a vertical plane on trunnions 784 and 786. During aiming operations, the latch 834 is not disturbed because the spool 852 remains stationary while the flanges 850 move with respect thereto.

The vehicle 12 also includes an upsetting device 880 (FIGS. 29 and 32–35) having a laterally extending, spring-biased arm 882 engageable with the surface 40 to overturn the vehicle 12 when the arm 882 is released from latched engagement with a lip 884 provided on the rear wall 714 of the body 630. The arm 882 is pivotally connected to the rear wall 714 by a pivot pin 886 which is affixed to the rear wall 714. The pin 886 is mounted with a loose fit in an aperture 888 provided in the end 890 of the arm 882 facilitating the canting of the arm 882 sufficiently to engage a hook 892 carried by the arm 882 over the lip 884.

The arm 882 is biased for clockwise rotation, as viewed in FIG. 32, by a torsion spring 894 having a body portion 896 coiled about the pivot pin 886, a first arm 898 bearing against a stop member 899 affixed to the housing 630 and a second arm 900 bearing against a shelf 902 extending from the arm 882. The arm 882 may be released so that the spring 894 will drive the free end 903 of arm 882 into engagement with the surface 40 by engaging a tab 904, which depends from arm 882, with a fixed object during travel of the vehicle 12 forwardly in the direction of arrow 906 (FIGS. 29 and 32) to cant the arm 882 sufficiently to release the hook 892 from the lip 884. The accessory means 30 (FIGS. 1 and 13a) is especially designed for engaging the tab 904 when the accessory means 30 is actuated while the vehicle 12 is traveling thereover. Alternatively, the arm 882 may be canted to release hook 892 by striking a target 908 from the rear in the direction of arrow 910 with a suitable object, such as the projectile 586 from the accessory means 34. This also releases the arm 882 permitting the spring 894 to drive the free end 903 of the arm 882 into engagement with the surface 40, as shown in FIG. 34. The force stored in the spring 894 is sufficient to over turn the vehicle 12, as shown in FIG. 35, when the free end 903 of arm 882 is stopped by the surface 40. The target 908 is affixed to the arm 882 by a bracket 912 having an offset portion 914 which positions the target 908 behind the rear wall 714.

The body 630 may be conveniently made from plastic material employing molding techniques and the sidewalls 708 and 710 may be suitably ornamented, as shown for the sidewall 708 in FIG. 1, to simulate a tank tread of the endless-track type.

In addition, the chassis 628 and all of the other elements which are cross-hatched in the drawings to indicate a plastic-type material may be made from suitable plastic materials employing molding techniques.

*Operation of the projectile-firing toy*

It will be apparent to those skilled in the art that the projectile-firing toy 10 has many different operating modes. For example, the vehicle 12 may be placed over the accessory means 32 with its trigger 438 engaging the abutment 440. The projectile-directing means 28 may then be rotated to swing the projectile-engaging member 808 in a horizontal plane until it is aimed at the target means 20. The member 808 may then be elevated by swinging it on its trunnions 836 and 838 to swing the member 808 in a vertical plane until it is aimed at the target means 20. The vehicle 12 can then be lifted from the accessory means 32 and the projectile 14 slid over the member 808 to compress spring 816 by engaging annular flange 830 behind shoulder 832 on latch 834 without moving the member 808 from its previously aimed position. After placing the vehicle 12 on the track section 44 upstream of the accessory means 32, as shown in FIG. 1, switch 664 may be actuated to energize motor 658 causing vehicle 12 to travel along track section 44 in the direction of arrow 418 toward accessory means 32. As the vehicle 12 approaches accessory means 32, the flanged wheel 446 will travel up ramp 422 and onto track section 436. Wheel 446 will then drop into depressed portion of track section 442 lowering end 448 of lever 866 into engagement with abutment 440. As the vehicle 12 continues its travel in the direction of arrow 418, the lever 866 will be moved to the broken line positions shown in FIG. 17 causing the trigger 438 to pivot clockwise about shaft 864 lowering spool 852 which, in turn, lowers the shoulder 832 from engagement with the annular collar 830 to release the projectile 14. The energy stored in compressed spring 816 will propel the projectile 14 away from the member 808 and, providing, the projectile-directing means 28 has been properly aimed, the projectile 14 will hit the target means 20 imparting a sufficient shock thereto to release the lever 610 from its engagement with the lug 620 whereupon spring 602 will impart counterclockwise rotation to the lever 610 causing it to engage the top wall 482 of base member 480 creating a reaction which turns the target means 20 over, as shown in FIG. 23.

As the vehicle 12 continues its travel in the direction of arrow 418, the vehicle 12 will move onto accessory means 34 with the Alpine gears 494 engaging the teeth 492 on racks 490 increasing the gear ratio and improving the traction of vehicle 12 so that it will have sufficient power to move the mechanism 524 by engaging lug 514 with the abutment 516. Had the target means 20 not been hit by the projectile 14, movement of mechanism 524 would cause the target means 20 to rotate in a clockwise direction, as viewed in FIG. 20, until the projectile 586 is aimed at the target 908 on vehicle 12 (FIG. 25). At this time the arm 594 engages upstanding plate 618 elevating the arm 590 sufficiently to release the annular collar 612 from engagement with the shoulder 614 provided on plate 538 whereupon the energy stored in arm 600 of spring 602 propels the projectile 586 into engagement with the target 908 moving it sufficiently to release the hook 892 from engagement with the lip 884 (FIG. 32). Spring 894 will then drive the end 903 of arm 882 into engagement with the surface 40 causing the vehicle 12 to upset, as shown in FIG. 35. If the projectile 586 misses the vehicle 12, it continues travelling over the accessory means 34 with the lug 514 engaging the abutment 516 until the wheel 446 rides up the built-up portion 510 of rail 500 to lift the lug 514 above the abutment 516.

The vehicle 12 is then free to pass from accessory means 34 onto a portion 44a of track section 44 travelling toward one of the vehicle-directing means 54, hereinafter designated 54a for clarity. After passing over means 54a, the vehicle 12 travels along a portion 44b of track section 44 onto one of the vehicle directing means 52, hereinafter designated 52a for clarity, where the wheel 446 engages a portion 42a of track section 42 directing vehicle 12 to the end 104 thereof. A second of the vehicle-directing means 52, hereinafter designated as 52b for clarity, then directs the vehicle 12 onto a portion 42b of track section 42 toward end 178 thereof where the vehicle 12 passes over a second of the vehicle-directing means 54, hereinafter designated 54b. At this time, if one of the units 244 is pushed to pressurize the vehicle-directing means 54b, the vehicle 12 is switched from the portion 42b of track section 42 onto the track section 48 along which it will travel toward a first of the vehicle-directing means 56, hereinafter designated 56a for clarity. The means 56a then directs the vehicle 12 onto a portion 46a of track section 46 toward end 320 and accessory means 36. If one of the units 244 is again pushed, accessory means 36 will be pressurized swinging the vehicle-contacting portion 368 into engagement with the lever 478 on trigger 746 swinging the arm 744 to its broken line position shown in FIG. 29. This releases the projectile 16 toward the target means 22. The vehicle 12 will then travel along a portion 46b of track section 46 to a second of the vehicle directing means 56, hereinafter designated 56b, which will direct the vehicle 12 from the portion 46b of track section 46 to a portion 50a of the track section 50 along which the vehicle 12 will travel. The vehicle 12 then passes a third one of the vehicle-directing means 52, hereinafter designated 52c for clarity, and moves toward end 178 of a portion 50b of track section 50 and a third one of the vehicle-directing means 54, hereinafter designated 54c. The vehicle 12 is directed by the vehicle-directing means 54c onto a portion 44c of the track section 44 along which vehicle 12 travels toward end 102 and a fourth one of the vehicle-directing means 52, hereinafter designated 52d for clarity, which, in turn, directs the vehicle onto a portion 46c of the track section 46 along which the vehicle 12 travels toward a first one of the T-connectors 268, hereinafter designated 268a, and the end 104 of track section 46a. The vehicle 12 then engages a fifth one of the vehicle-directing means 52, hereinafter designated 52, which directs the vehicle 12 toward the end 178 of a portion 46d of track section 46 and onto vehicle-directing means 54b which directs the vehicle 12 onto end 178 of portion 42b of track section 42. The vehicle 12 travels along portion 42b of track section 42 to vehicle-directing means 52b which directs the vehicle 12 onto a portion 42c of track section 42 leading to a second one of the T-connectors 268, hereinafter designated 268b for clarity. The vehicle 12 then passes over T-connector 268b and travels along a portion 42d of track section 42 toward vehicle-directing means 52a across which the vehicle passes continuing on portion 42a of track section 42 toward end 104 and vehicle-directing means 52b. The vehicle 12 then travels on portion 42b of track section 42 toward end 178 thereof and vehicle-directing means 54b. If the vehicle-directing means 54b is not energized by pushing one of the units 244, the vehicle 12 will travel across vehicle-directing means 54b onto end 178 of portion 46d of track section 46 along which the vehicle 12 will travel toward the vehicle-directing means 52e. From vehicle-directing means 52e, the vehicle 12 travels onto end 104 of portion 46c of track section 46, across T-connector 268a and vehicle-directing means 52d and onto end 104 of portion 44c of track section 44. The vehicle 12 travels along portion 44c of section 44 to vehicle-directing means 54c. If one of the units 244 is then pushed to pressurize the means 54c, the vehicle 12 will be directed onto end 178 of portion 50b of track section 50 along which the vehicle 12 will travel to the vehicle-directing means 52c. The vehicle 12 then travels along a portion 50c of track section 50 toward the accessory means 30.

As the vehicle 12 approaches the accessory means 30, actuation of either of the units 244 actuates accessory means 30 elevating the member 368a into engagement with depending tab 904 on the arm 882 releasing it so that it will upset the vehicle 12 in the manner heretofore described. If the accessory means 30 is not actuated, the vehicle 12 will continue travelling along a portion 50d of track section 50 and onto accessory means 56b across which the vehicle 12 travels passing onto a portion 46e of track section 46. The vehicle 12 then travels along 46e of track section 46 toward the vehicle-directing means 52d which directs the vehicle 12 onto portion 46c of track section 46 toward T-connector 268a and end 104 of portion 46c of track section 46. The vehicle 12 will then pass across vehicle-directing means 52e and continue along portion 46d of track section 46 to end 178 where the vehicle passes onto vehicle-directing means 54b. The vehicle 12 is then directed onto end 178 of portion 42b of track section 42 and toward the vehicle-directing means 52b from whence the vehicle 12 travels along portion 42c of track section 42 to the T-connector 268b. The vehicle 12 then travels along portion 42d of track 42 and onto vehicle-directing means 52a which directs the vehicle 12 toward the end 104 of portion 42a of track section 42. At this point, the vehicle 12 passes over the vehicle-directing means 52b which directs the vehicle 12 back along portion 42b of track section 42 to end 178 and vehicle-directing means 54b. If the units 244 are then energized, the vehicle 12 is again directed onto track section 48. On the other hand, if the units 244 are not energized, the vehicle 12 passes across the vehicle-directing means 54b onto end 178 of track section 46.

While the particular projectile-firing toy herein shown and described in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

What is claimed is:

1. A projectile-firing toy, comprising:
   (a) a projectile-carrying vehicle for transporting projectile means along a predetermined course;
   (b) means for directing said vehicle along said predetermined course;
   (c) target means adjacent the path of travel of said vehicle;
   (d) projectile-firing means associated with said vehicle for firing said projectile means therefrom;
   (e) projectile-directing means connected to said projectile-firing means for aiming said projectile means at said target means;
   (f) said target means including projectile-directing means having means connected thereto for upsetting said target means when said target means is struck by said projectile means fired from said vehicle, said target projectile-directing means also having projectile-firing means associated therewith for firing a projectile at said vehicle when said vehicle passes said target means without scoring a hit thereon.

2. A toy as stated in claim 1 including target-directing means connected to said target means for aiming said target means at said vehicle, said target-directing means including abutment means engageable by said vehicle for actuating said target-directing means.

3. A projectile-firing toy, comprising:
   (a) a projectile-carrying vehicle for transporting projectile means along a predetermined course defining a path of travel;
   (b) means associated with said vehicle for directing said vehicle along said predetermined course;
   (c) target means adjacent said path of travel of said vehicle;
   (d) projectile-firing means associated with said vehicle for firing said projectile means therefrom;
   (e) projectile-directing means connected to said projectile-firing means for aiming said projectile means at said target means;
   (f) projectile-firing means carried by said target means for firing a projectile at said vehicle; and
   (g) means adjacent said target means, within said path of travel, and engageable and movable by said vehicle for actuating said projectile firing means of said target.

4. A projectile-firing toy as stated in claim 3 wherein said vehicle includes vehicle upsetting means connected to said vehicle for upsetting said vehicle when said upsetting means is actuated and wherein said toy includes actuating means selectively positionable in the path of travel of said vehicle for actuating said upsetting means.

5. A toy as stated in claim 2 wherein said upsetting means comprises a target element on said vehicle, actuated when struck by a projectile from said target means.

6. A projectile-firing toy as stated in claim 3 wherein said projectile means includes a cylindrical body portion and an annular collar encompassing said body portion and wherein said projectile-firing means includes a compression spring adapted to be compressed while engaging said cylindrical body portion for storing energy to propel said projectile means from said projectile-firing means when said compression spring is released and L-shaped trigger means pivotally mounted in said vehicle, said trigger means having a first arm engaging said collar and a second arm depending to a position adjacent said directing means for releasing said projectile means when said second arm is swung to a predetermined position where said first arm is disengaged from said collar and wherein said projectile-firing means also includes abutment means positionable in the path of travel of said vehicle for engagement by said second arm.

7. A projectile-firing toy as stated in claim 3 wherein said vehicle directing means includes a flanged, castered wheel mounted on said vehicle and a pliable member defining said predetermined course, said flanged wheel engaging said pliable member for guiding said vehicle about said predetermined course.

8. A projectile-firing toy as stated in claim 7 wherein said predetermined course includes a plurality of paths and wherein said vehicle directing means includes switch means connected to said pliable member in the path of travel of said vehicle for directing said vehicle from one of said paths to another of said paths.

9. A projectile-firing toy as stated in claim 8 wherein said switch means is fluid actuated, wherein said pliable member forms conduit means carrying fluid to said switch means and wherein said vehicle directing means includes pump means connected to said pliable member for supplying a fluid under pressure to said switch means for actuating said switch means from a remote location.

10. A projectile-firing toy as stated in claim 9 wherein said vehicle includes vehicle upsetting means connected to said vehicle for upsetting said vehicle when said upsetting means is actuated and wherein said toy includes fluid-energizable, actuating means in fluid communication with said pliable member and said pump means for actuating said upsetting means when said actuating means is energized, said actuating means being energized by said pump means.

11. A projectile-firing toy as stated in claim 9 wherein said switch means includes a pressurizable chamber, a diaphragm mounted in said chamber and an upstanding flange mounted on said diaphragm, said flange being elevated to a position adjacent said pliable member when said chamber is pressurized, said flange being engageable with said wheel to turn said wheel when said flange is in said elevated position, said chamber being pressurized by said pump means.

12. A projectile-firing toy as stated in claim 6 wherein said abutment means comprises:
    a fluid-pressurizable chamber;
    a diaphragm mounted in said chamber for flexing movements when said chamber is pressurized;
    an upstanding flange mounted on said diaphragm for reciprocation by said diaphragm when said diaphragm is flexed by changing the pressure in said chamber;
    a third arm pivotally mounted on said chamber in cooperative association with said flange for actuation thereby, said third arm engaging said second arm when actuated; and
    pneumatic means connected to said chamber for varying fluid pressure therein.

References Cited

UNITED STATES PATENTS

| | | | |
|---|---|---|---|
| 294,076 | 2/1884 | Reed | 273—101 |
| 1,080,363 | 12/1913 | Miller | 246—415 |
| 2,404,653 | 7/1946 | Plebanek | 273—101.1 |
| 2,821,938 | 2/1958 | Müller. | |
| 2,992,004 | 7/1961 | Glass | 273—102.1 |
| 3,000,137 | 9/1961 | Vine | 46—202 |
| 3,025,846 | 3/1962 | Crosman | 46—74 XR |
| 3,148,478 | 9/1964 | Miller | 46—202 XR |

LOUIS G. MANCENE, *Primary Examiner.*

CHARLES R. WENTZEL, *Assistant Examiner.*

U.S. Cl. X.R.

273—101, 102.1, 105.2; 124—16